No. 755,316. PATENTED MAR. 22, 1904.
J. G. RANGER, Jr.
WHEEL.
APPLICATION FILED MAY 29, 1903.
NO MODEL.
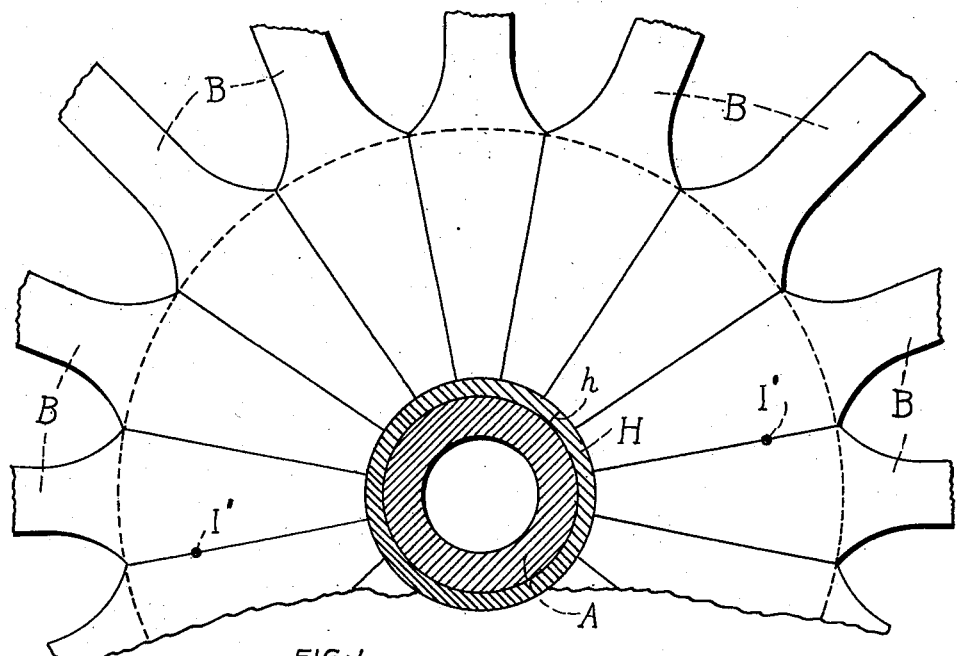
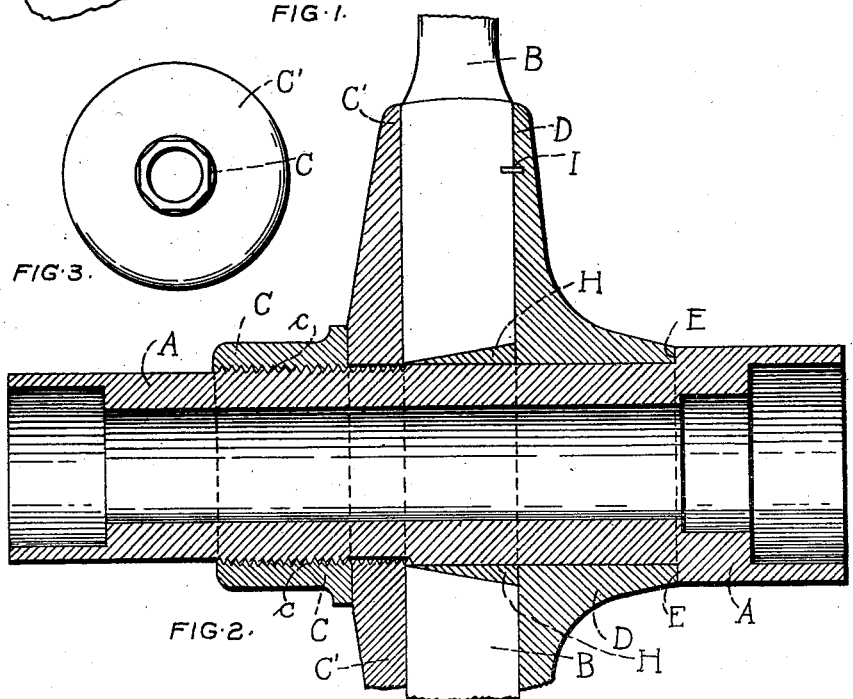
WITNESSES:
William Gordon
Emma Heckel
INVENTOR
Joseph G. Ranger Jr.
BY
Eugene Ayres,
ATTORNEY.

No. 755,316.

Patented March 22, 1904.

UNITED STATES PATENT OFFICE.

JOSEPH G. RANGER, JR., OF SALEM, NEBRASKA.

WHEEL.

SPECIFICATION forming part of Letters Patent No. 755,316, dated March 22, 1904.

Application filed May 29, 1903. Serial No. 159,287. (No model.)

*To all whom it may concern:*

Be it known that I, JOSEPH G. RANGER, Jr., a citizen of the United States, residing at Salem, in the county of Richardson and State of Nebraska, have invented certain new and useful Improvements in Wheels; and I do declare the following to be a full, clear, and exact description of the invention, such as will enable others skilled in the art to which it appertains to make and use the same, reference being had to the accompanying drawings, and to the letters of reference marked thereon, which form a part of this specification.

The objects of my improvements are, first, to provide a wheel in the manufacture of which machines for turning, mortising, boring, shrinking the bands on the hub, tenoning spokes at the hub ends, and shrinking tires may be dispensed with; second, in which both machinery and skilled labor are dispensed with for setting the boxing; third, in which it is unnecessary to reset the tire when the felly or one or more spokes need replacing or other repairs are necessary; fourth, in which breakage of spokes is reduced to a minimum, there not being any shoulder or tenon at the hub to give leverage for breakage, and, fifth, which may be "knocked down" at the manufactory and shipped in small compass at reduced expense to distant points and readily set up again by any person, even though unskilled in this particular branch of labor or in any branch of labor.

I attain my objects by the mechanism illustrated in the accompanying drawings, in which—

Figure 1 is a vertical section of a wheel cut at the line of the inside of the back collar, showing the spokes, the wedge, the boxing, and the dowel-pin holes, part of the spokes and the fellies and tire being broken away. Fig. 2 is a vertical cross-section of the wheel, showing the boxing, the wedge, the face and back collars, and a dowel-pin, the outer ends of the spokes and the fellies and tire being broken away; and Fig. 3 is a detail front view of a face-collar.

Similar letters refer to similar parts throughout the several views.

In the drawings, A illustrates the metal boxing of the wheel, and B B are the wheel-spokes, their outer or felly ends shown as broken away. These spokes are manufactured in the form shown in the drawings, the ordinary tenons at the inner or hub ends being dispensed with. The hub ends of the spokes are manufactured somewhat wedge shape, as shown in Fig. 1, their flat wedge sides fitting one against the other, forming a solid of that part of the wheel usually constituting the greater part of the hub. The face-collar is preferably made in two parts when used on heavy vehicles, C representing the front section, which is provided with a thread c, adapting it to engage with a corresponding thread in boxing A, and C' representing the inside section, which serves as a washer between the spokes and the outside, C, part of the collar. This collar is preferably octagonal, but may be constructed of different form and undivided without departing from the aim of my invention.

D represents a back collar adapted to fit against a shoulder E on boxing A and may also be made of any design. H is a wedge adapted to slip over said boxing up against said back collar. This wedge is made slightly less than the widths of the spokes. Its inside fits snugly around the boxing. At the edge contacting with the back collar it is about one-eighth of an inch in thickness, sloping thence to a point at about three-sixteenths of an inch from the face-collar. The purpose of this wedge is to force the spokes outward against the fellies, thereby tightening the tires, and it is of especial value when the wood has become shrunken or worn. Said wedge is divided at one point, as shown at $h$, so that when a spoke shrinks or wears endwise the wedge may be opened and any suitable article inserted to spread the wedge apart, so as to take up the wear.

I I are dowel-pins carried by the back collar, which when the wheel is complete and said collar is on project into the spokes about one-fourth of an inch.

I' I' are the apertures in the spokes to receive the dowel-pins.

The dimensions given in these specifications are about what should be used in the construction of an ordinary one-inch buggy-wheel, but would vary with the weight of the wheel.

If a spoke becomes loose in its felly or in its hub or other repairs are required, it is simply necessary that the face-collar be unscrewed, the back end of the boxing set upon an end of a short piece of four by four or otherwise elevated a few inches above the ground or on a platform and the tire and fellies pressed down evenly around the entire periphery of the wheel. The spokes will thus be loosened at their boxing ends. One or all can be lifted out and be replaced by others, the four by four can be withdrawn, the central part of the hub pressed down to a horizontal with the wheel periphery, and the face-collar replaced and tightened against the spokes. The wheel is then again ready for use, or the entire metal part of the hub can be removed and the spokes lifted upward at their box ends until loosened from each other, when necessary repairs can be readily made.

What I claim, and desire to secure by Letters Patent, is—

1. In a vehicle-wheel the combination with the metal boxing, the tire and the fellies, of a divided metal wedge adapted to fit around said boxing and the face of which is oblique, the wedge-shape spokes adapted to form a solid one against another and with said wedge, the back collar and the shoulder on said boxing with which said collar engages, the face-collar consisting of a front section and an inside piece to serve as a washer and provided with a thread to engage with the boxing, substantially as shown and described.

2. In a wheel, the combination with the boxing, fellies and tire, of wedge-shape spokes with inside ends beveled, a divided wedge fitted between the boxing and said beveled ends of the spokes, and the collars hugging the boxing and inclosing between their inner sides the contacting wedge-shape ends of said spokes and the divided wedge, substantially as described and for the purpose specified.

3. In a wheel a divided wedge with its upper side beveled permitting adjustment with the beveled ends of the spokes, its inner side contacting with the collar and in line with the periphery of the spokes, its outer edge spaced from the collar to permit wear, substantially as described and shown.

4. The combination with the boxing of a wheel, of a divided wedge its outside beveled, a shoulder on the boxing, a back collar fitted at its base between said shoulder and wedge, a face-collar, the wedge-shaped spokes having beveled ends adapted to set upon said wedge and the entire sides of the wedge ends of which are held firmly between said collars, substantially as described and for the purpose specified.

In testimony whereof I affix my signature in presence of two witnesses.

JOSEPH G. RANGER, Jr.

Witnesses:
M. A. MOORE,
WILL FINDLEY.